United States Patent [19]

Ishida

[11] Patent Number: 5,274,769
[45] Date of Patent: Dec. 28, 1993

[54] SYSTEM FOR TRANSFERRING DATA BETWEEN BLOCKS

[75] Inventor: Junichi Ishida, Yokohama, Japan

[73] Assignee: Fujitsu Limited, Kawasaki, Japan

[21] Appl. No.: 711,381

[22] Filed: Jun. 6, 1991

Related U.S. Application Data

[63] Continuation of Ser. No. 400,093, Aug. 29, 1989, abandoned.

[30] Foreign Application Priority Data

Aug. 29, 1988 [JP] Japan .................. 63-212563

[51] Int. Cl.$^5$ .................. G06F 13/36
[52] U.S. Cl. .................. 395/275; 395/200
[58] Field of Search .................. 395/200, 275; 370/58, 370/112; 340/825.03, 825.06

[56] References Cited

U.S. PATENT DOCUMENTS

| | | | |
|---|---|---|---|
| 4,212,080 | 7/1980 | Milliken | 364/900 |
| 4,227,178 | 10/1980 | Gergaud et al. | 364/900 |
| 4,417,303 | 11/1983 | Korowitz et al. | 364/200 |
| 4,497,033 | 1/1985 | Hernandez et al. | 364/900 |
| 4,500,951 | 2/1985 | Sugimoto et al. | 364/186 |
| 4,644,547 | 2/1987 | Vercellotti et al. | 364/200 |
| 4,701,757 | 10/1987 | Schuck et al. | 340/825.06 |
| 4,737,951 | 4/1988 | Krüger et al. | 370/58 |
| 5,083,260 | 1/1992 | Tsuchiya | 395/325 |
| 5,167,022 | 11/1992 | Bahr et al. | 395/325 |

FOREIGN PATENT DOCUMENTS 55-119727 9/1980 Japan .

Primary Examiner—Dale M. Shaw
Assistant Examiner—C. Shin
Attorney, Agent, or Firm—Staas & Halsey

[57] ABSTRACT

A system for multiplexed transfer of data between plural blocks interconnected by a two-way data bus of a predetermined number of bus lines provides for simultaneous and parallel transfer over the plural bus lines of plural data bits, up to the same, maximum predetermined number of the bus lines. Each parallel data bit transfer is selectively controllable with respect both to the number and the direction of transfer of the individual data bits over the respectively corresponding bus lines of the two-way data bus. Each block comprises a plurality of internal circuit cards, an internal bus of plural bus lines, of the same predetermined number, respectively connected to plural internal circuit cards of the block, and plural two-way transfer gates respectively associated with and selectively operable for interconnecting the corresponding bus lines of the internal bus and the two-way data bus. A common control means issues external command signals to respective transfer control means of the plural blocks for establishing, selectively, first and second modes of operation of the two-way gate circuits for transferring data in corresponding, opposite directions over respectively corresponding bus lines of the two-way data bus between the two or more different blocks, and a third mode of operation in which data is transferred exclusively over the internal bus of a given block between plural circuit cards of the block.

10 Claims, 14 Drawing Sheets

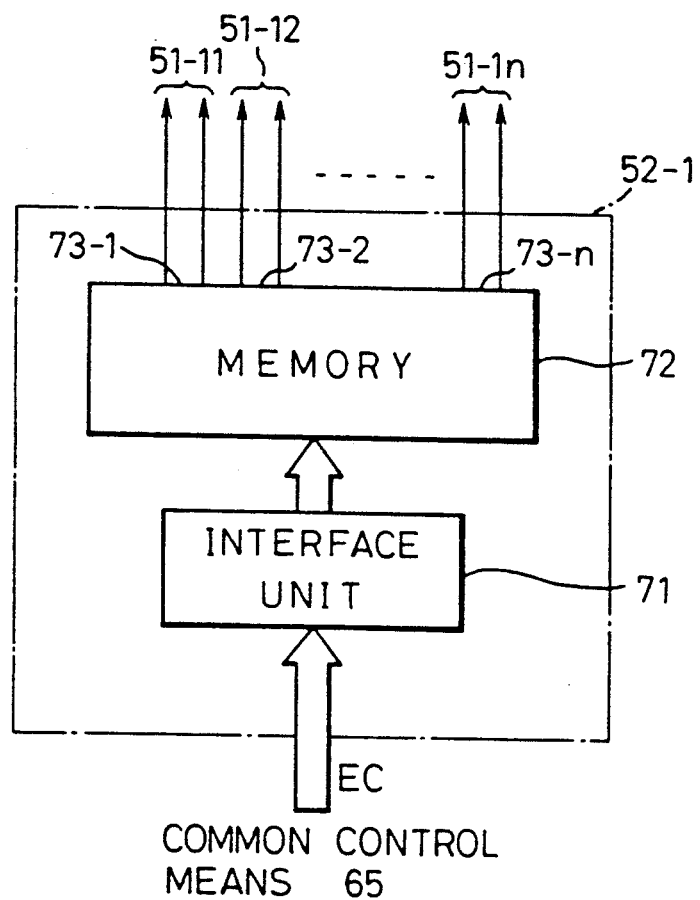

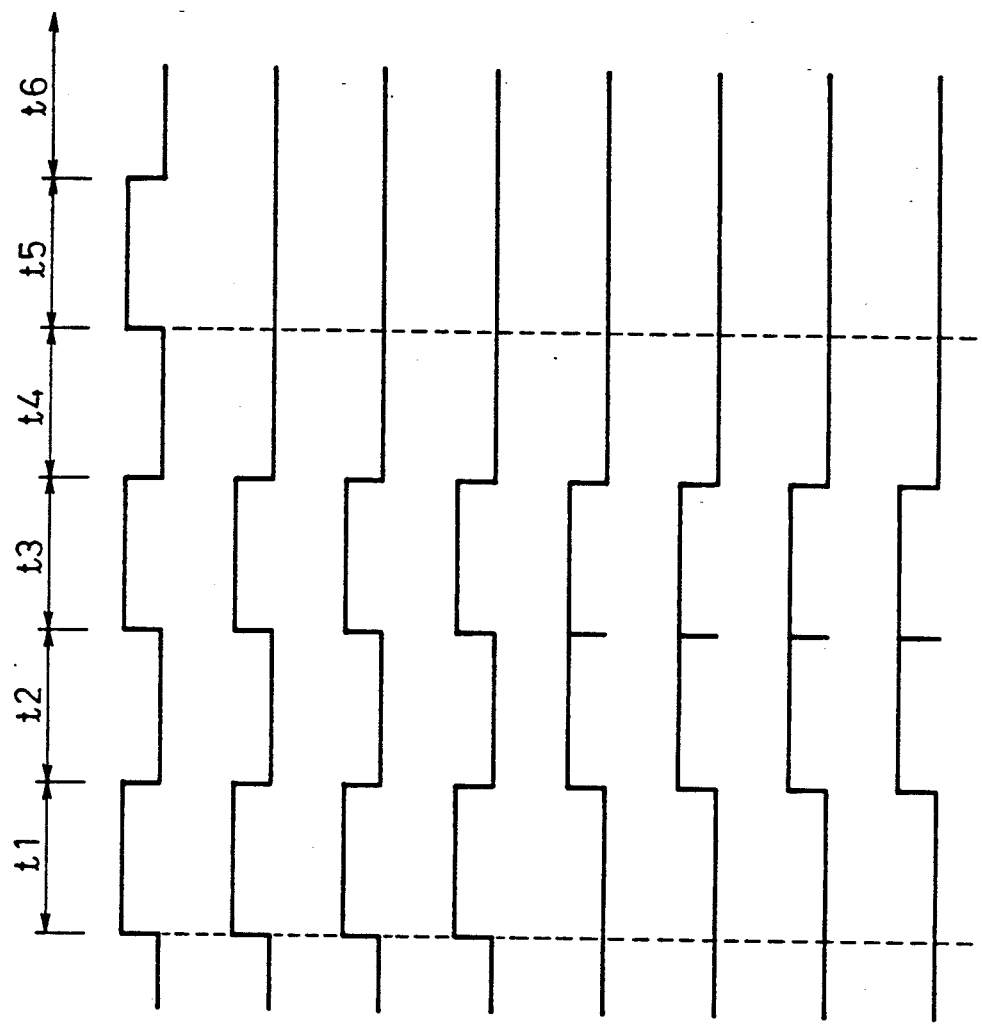

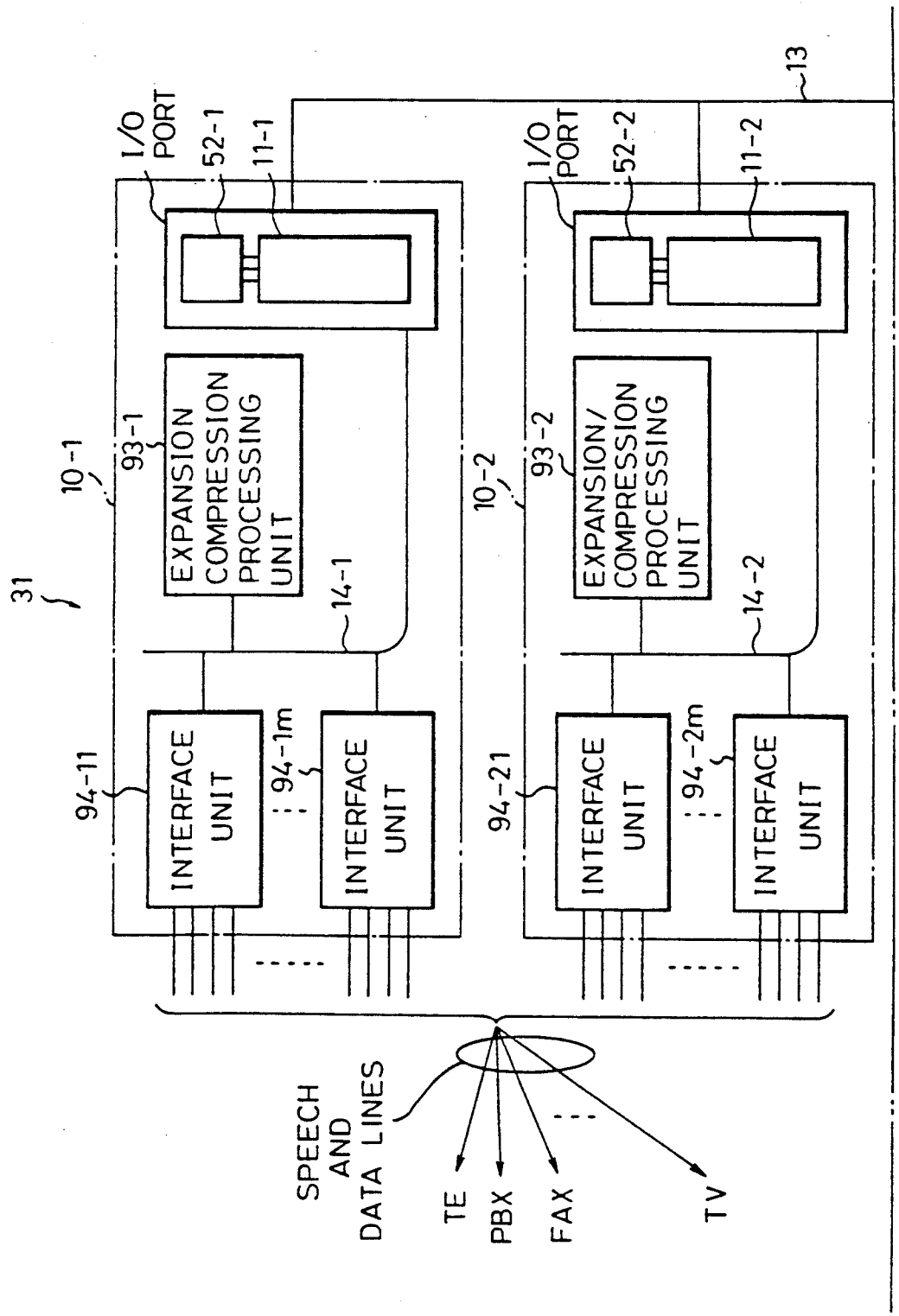

SYSTEM FOR TRANSFERRING DATA BETWEEN BLOCKS

This application is a continuation, of application Ser. No. 07/400,093, filed Aug. 29, 1989, now abandoned.

BACKGROUND OF THE INVENTION

1. Field of the Invention

The present invention relates to a system for transferring data between blocks, and more particularly to blocks constructing a time division multiplexer used preferably for a so-called multi-media communication system.

In general, a time division multiplexer is constructed by a plurality of blocks so as to increase the number of channels to be accommodated in the multimedia communication system which handles both digital data of, e.g., computers, televisions, and facsimiles, and digital signals such as telephone speech signals. Further, the blocks are usually connected to each other via a two-way data bus which transfers the bits of data in parallel, i.e., a parallel data transfer.

In such a time division multiplexer, it is desired to further increase efficiency of data transfer between the blocks.

2. Description of the Related Art

The prior art system for transferring data between blocks will be explained in detail hereinafter, and an outline thereof will be given below.

The prior art system employed in a time division multiplexer is primarily comprised of transfer control units, contained in each block, and a two-way data bus for connecting the blocks to each other. Each of the transfer control units is constructed with both two-way gate circuits and a direction control unit which cooperates with the corresponding two-way gate circuits. Thus, two-way data communication can be achieved between every two blocks through the two-way data bus.

The above-mentioned prior art system, however, produces some problems, as will be described below. The media to be accommodated in the time division multiplexer is not limited to single information, such as a telephone speech signal only, but a variety of information including picture signals, video signals and the like can be accommodated. In this case, a variety of transmission speeds exist in the multiplexer in correspondence with respective information to be transferred. Therefore, it is necessary to adopt a variety of constructions for the multiplexer in order to cope with the variety of media information. A first problem arises here that, when a variety of multiplexers are prepared for respective media information, the manufacturing cost rises due to the increased variety but reduced amount of production.

The transfer control units of the prior art are operative only to change the direction of transfer of data, as a whole, under control of the aforesaid direction control units. Therefore, even if the number of the parallel transfer data bits is smaller than the number of bit lines of the two-way data bus, in a case where a low transmission speed data is handled, the whole group of bit lines of the data bus is occupied by the low transmission speed data which is usually composed of a smaller number of bits than the number of bit lines of the two-way data bus. A second problem arises here that efficiency of data transfer through the two-way data bus is reduced due to the above-mentioned redundant occupation of the data bus.

Further, in a case where many blocks are mounted in the multiplexer, a mixture of both high transmission speed data and low transmission speed data is often transferred on the data bus. A third problem arises here that the number of channels to be accommodated in the multiplexer is limited to some extent since the data bus cannot be used, in such case, with high efficiency.

SUMMARY OF THE INVENTION

Accordingly, an object of the present invention is to provide a system for transferring data between blocks, which system can improve the efficiency of data transmission between the blocks via the data bus.

To attain the above object, the system of the present invention is comprised of two-way gate circuits which are mounted in each block and the number of which is the same as the number of bit lines of the two-way data bus. The present invention is featured by flexible two-way gate circuits in terms of both the number of bits and the direction of each data bit handled by the two-way gate circuits of any given block. That is, the two-way gate circuits are not treated as a whole, as in the prior art, but are treated individually according to an external command.

BRIEF DESCRIPTION OF THE DRAWINGS

The above object and features of the present invention will be more apparent from the following description of the preferred embodiments with reference to the accompanying drawings, wherein:

FIG. 7 is a block diagram of an example of the transfer control means:

FIG. 8(1a)–8(8a) depict timing charts for explaining the individual control of the transfer gates;

FIG. 12A–12B are detailed block diagram of an example of a multiplexer to which the present invention can be applied.

DESCRIPTION OF THE PREFERRED EMBODIMENTS

Before describing the embodiments of the present invention, the related art and the disadvantages therein will be described with reference to the related figures.

Figure 1:
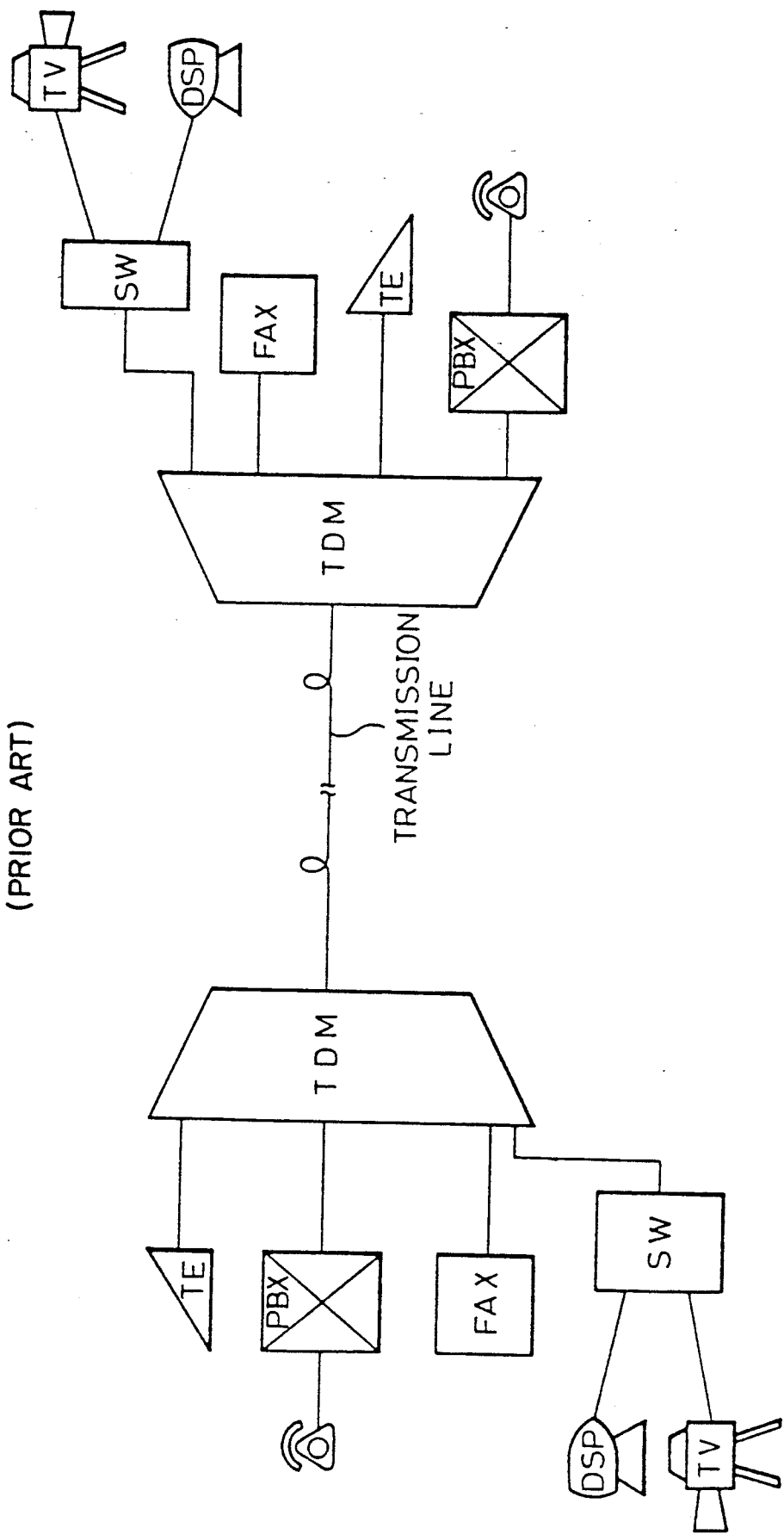
FIG. 1 is a view of a typical data communication network to which the present invention is preferably applied.

FIG. 1 is a view of typical data communication network to which the present invention is preferably applied. In FIG. 1, remote offices (illustrated at left and right sides of FIG. 1) are connected by, for example, a private inter-city line ("TRANSMISSION. Each of the offices has various communication apparatuses, such as data terminal equipment (TE), a private branch exchange (PBX), a facsimile unit (FAX), a TV camera and a video display (DSP) both commonly connected to a switch (SW), and the like, as illustrated in FIG. 1. The variety of data of these communication apparatuses are integrated by a time division multiplexer (TDM) so as to commonly use the single transmission line. The TDM, in general, also includes therein a demultiplexing means so as to attain two-way data communication. The present invention relates to the TDM, and more particularly to a system for transferring data between blocks which comprise the TDM.

Figure 2:
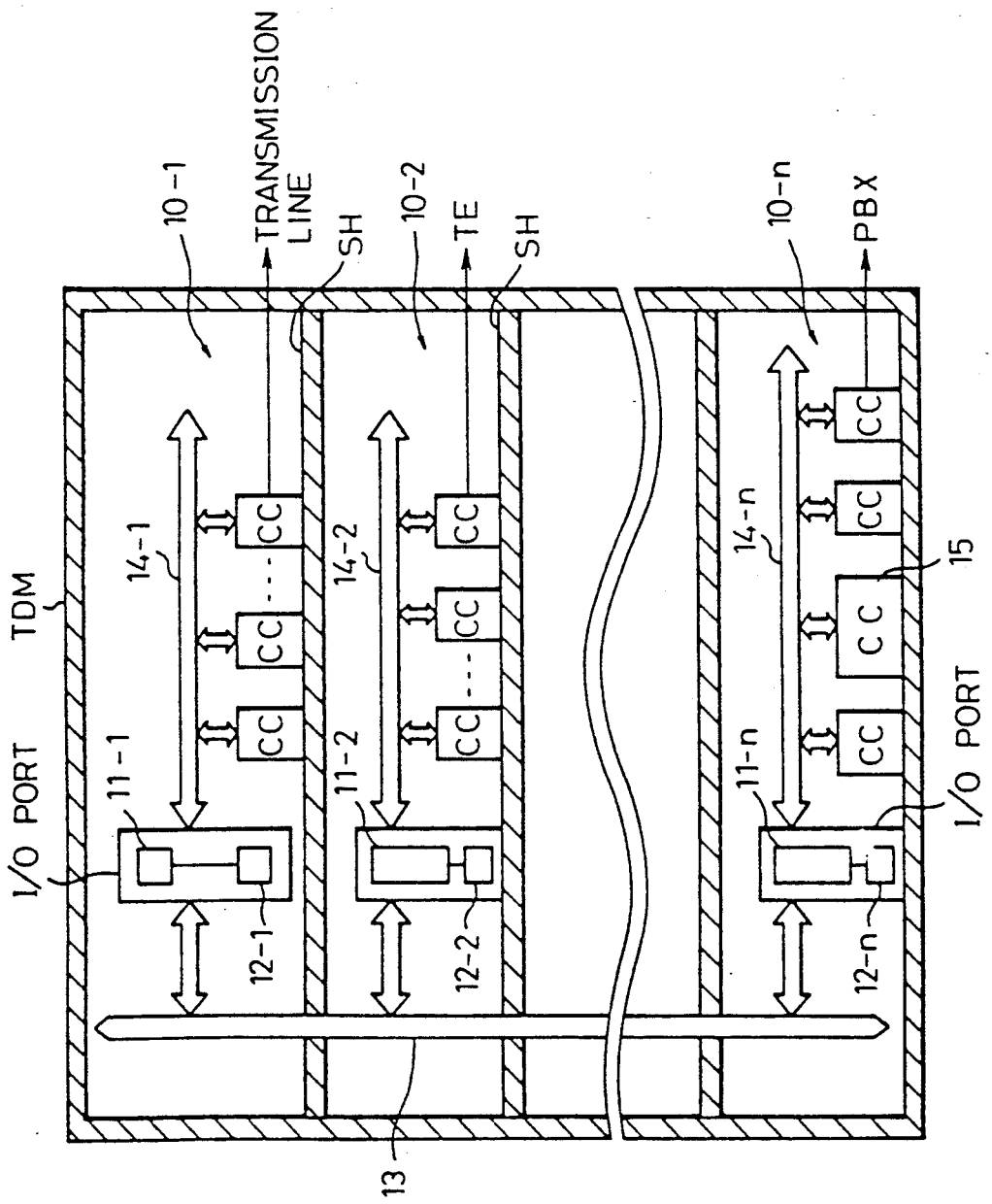
FIG. 2 illustrates a schematic front view of a time division multiplexer.

FIG. 2 illustrates a schematic front view of a time division multiplexer. In FIG. 2, the time division multiplexer TDM is formed as a locker having a plurality of shelves SH's. Each shelf SH forms a block. In the figure, n number of blocks 10-1, 10-2 through 10-n are formed. The data in the TDM is transferred between the blocks (10) via a two-way data bus 13 through respective input/out (I/O) ports. At the I/O ports, respective two-way gate circuits 11-1, 11-2 through 11-n are located together with the corresponding transfer controlling units 12-1, 12-2 through 12-n. The two-way gate circuits (11) are connected to the corresponding circuit cards (CC) of the associated block via a corresponding internal bus (14). The circuit cards CC play various roles as, for example, an interface unit. One of the circuit cards CC in the block 10-1 cooperates with, for example, a private transmission line. One of the circuit cards CC in the block 10-2 cooperates with, for example, a data terminal equipment (TE) and one of the circuit cards CC in the block 10-n cooperates with, for example, a private branch exchange (PBX). In the example, a common control unit 15, formed as a circuit card CC, is located on the bottom shelf SH. Incidentally, the card CC may freely be added or removed according to needs or a change of the number of line channels.

Figure 3:
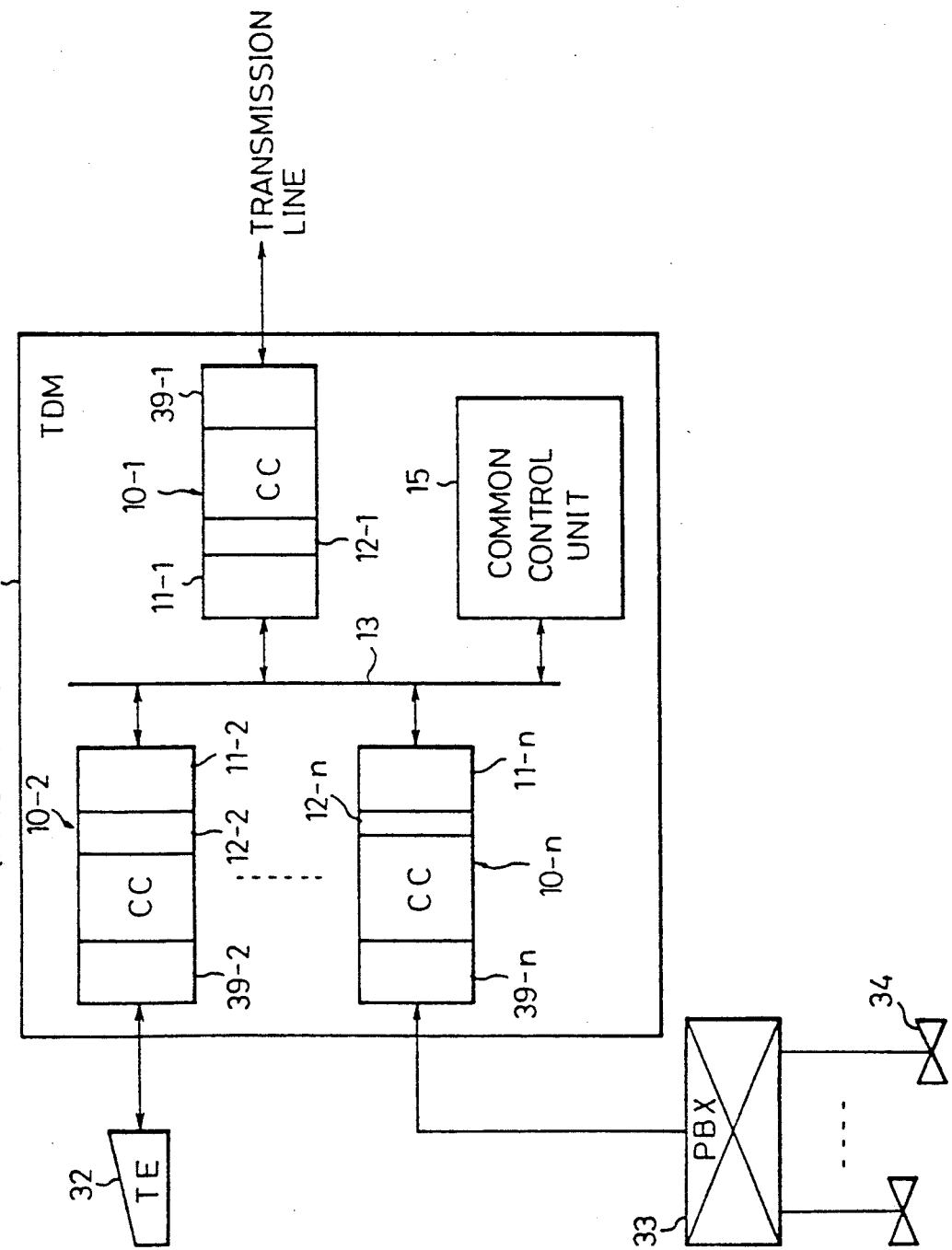
FIG. 3 is a general block diagram of a time division multiplexer set up with a prior art system for transferring data between the blocks.

FIG. 3 is a general block diagram of a time division multiplexer set up with a prior art system for transferring data between the blocks. In FIG. 3, members identical to those explained before are represented by the same reference numerals and characters (and the same for later figures). The time division multiplexer (TDM) is represented by reference numeral 31. The TDM 31 is connected with, for example, data terminal equipment (TE) 32 and a private branch exchange 33 which is provided with telephone sets 34. These communication apparatuses, e.g., TE 32, PBX 33, and the like, and the transmission line are introduced into the TDM 31 via respective peripheral interface units 39-2 through 39-n and a line interface unit 39-1, which are formed as the circuit cards CC. The blocks 10-1, 10-2, through 10-n, the two-way gate circuits 11-1, 11-2 through 11-n, the transfer control units 12-1, 12-2 through 12-n, the two-way data bus 13 and the common control unit 15 were explained before; however, the internal buses (see 14-1, 14-2 through 14-n in FIG. 2) are not illustrated in FIG. 3 for brevity.

The block 10-1 receives data, which is transferred thereto via the two-way data bus 13 from the blocks 10-2 through 10-n, and then multiplexes the same at the two-way gate circuit 11-1. The multiplexed data is output to the transmission line via the line interface unit 39-1. The multiplex operation can be achieved by use of the gate circuit 11-1 under suitable gate timing control. Therefore, the gate circuit 11-1 can also demultiplex the multiplexed data received via the transmission line and the demultiplexed data is then distributed to the blocks 10-2 through 10-n.

Figure 4:
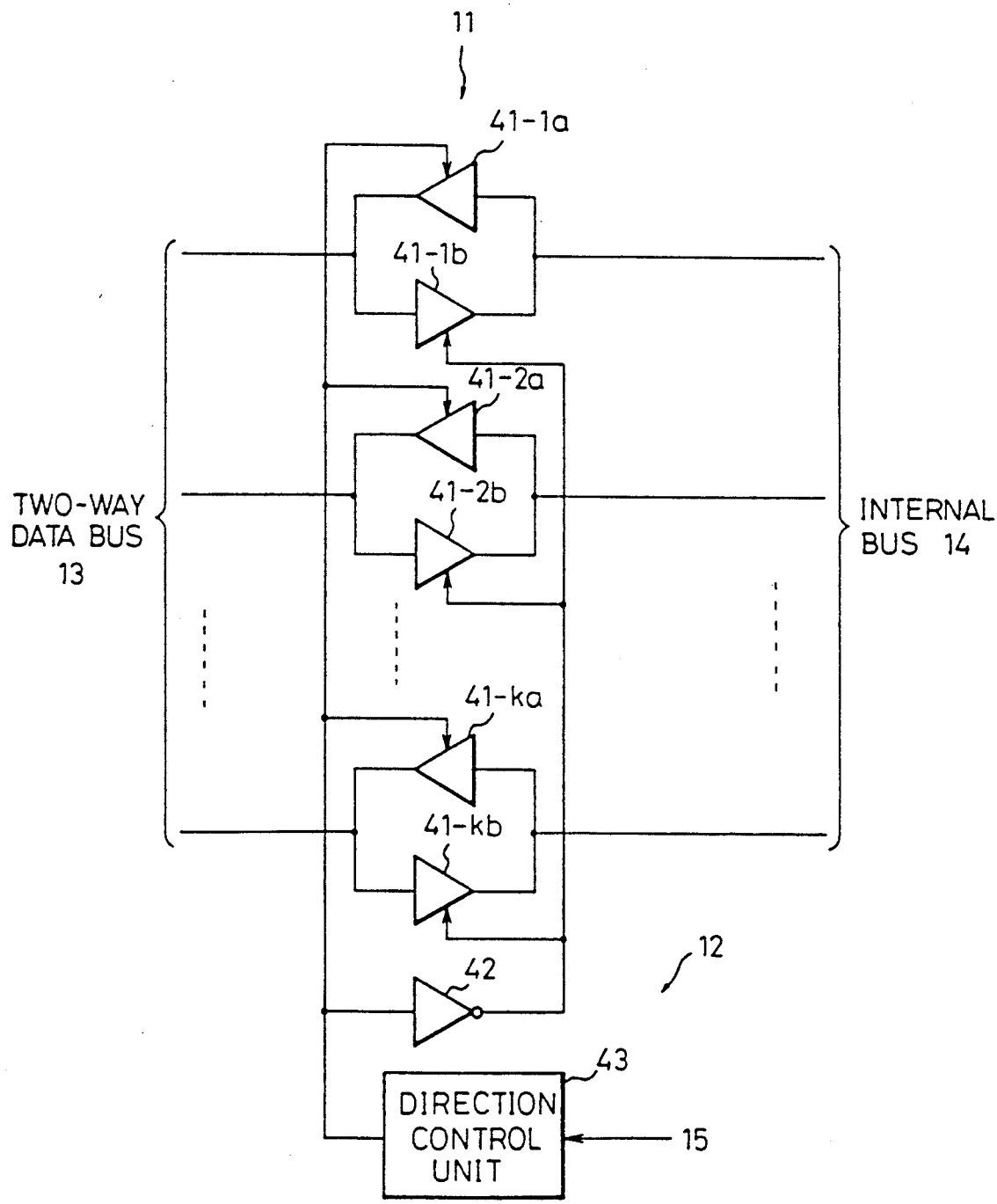
FIG. 4 is a circuit diagram of prior art gate circuits and a transfer control unit.

FIG. 4 is a circuit diagram of prior art gate circuits and the transfer control unit. In FIG. 4, the two-way gate circuit 11 (11 is representative of each of 11-1 through 11-n of FIG. 3) is comprised of a plurality of bus drivers 41-1a to 41-ka and 41-1b to 41-kb. The transfer control unit 12 (12 is representative of each of 12-1 through 12-n of FIG. 3) comprises an inverter 42. The bus drivers 41-1a through 41-ka and bus receivers 41-1b through 41-kb are activated complementarily by the inverter 42. Which side, a or b, is to be activated is determined by a direction control unit 43 which receives an external command ("EXT.CMND") given from the common control unit ("CCU") 15. If the unit 43 produces logic "H", all the bus drivers 41-1a through 41-kb are activated simultaneously, and the data of k (refer to reference character k which is, for example, 8) bits passes from the data bus 13 to the external bus 14. Contrary to the above, if the unit 43 produces logic "L", all the bus receivers 41-1b through 41-1kb are activated simultaneously, and the data of k bits passes from the internal bus 14 to the data bus 13.

The above-explained prior art system (41-1a through 41-1k, 41-1b through 41-kb, 42 and 43) produces, however, the previously mentioned three problems.

Figure 5:
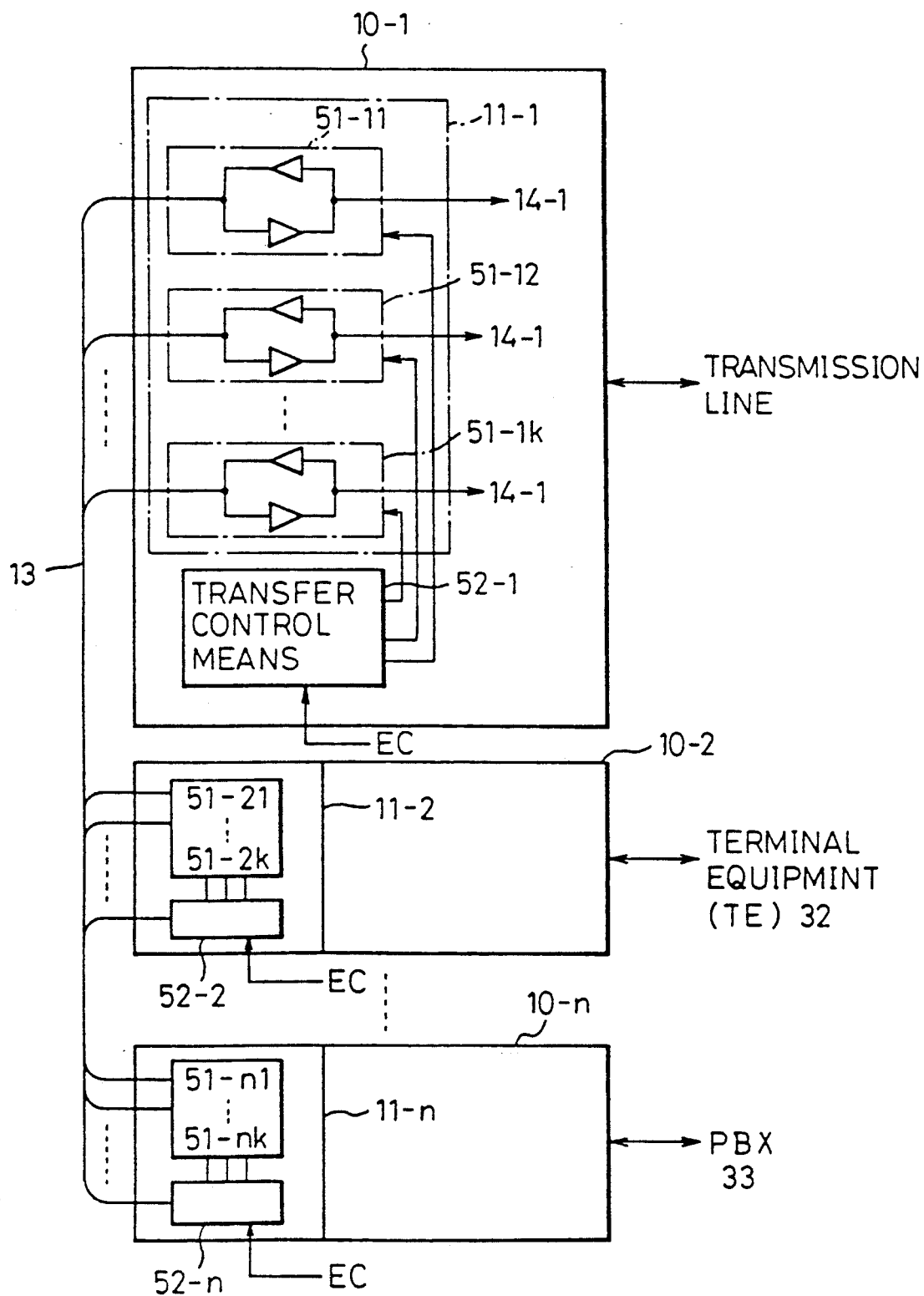
FIG. 5 is a principle circuit diagram of a system for transferring data between the blocks according to the present invention.

FIG. 5 is a principle circuit diagram of a system for transferring data between the blocks according to the present invention. In general, the system of FIG. 5 is constructed such that the plural (e.g., 8), parallel bit lines of the two-way data bus 13 can freely be separated for use. That is, the system of FIG. 5 is comprised of: a plurality of the blocks 10-1 through 10-n, each including therein at least one two-way gate circuit (11) including a plurality of transfer gates (51), at its input/output port (FIG. 2), and internal circuit cards (CC in FIG. 2); the two-way data bus 13 for transferring data between any two or more of the blocks (10) via their respective input/output ports; a plurality of transfer control means (52), provided for the respective blocks (10), each transfer control means (52) being operative in response to an external command EC, to control the transfer gates (51) independently such that both the number of bits of data, and the direction of the transfer thereof, to be handled at each gate circuit (11) transfer gates (51), by the respective are determined individually.

That is, thereof, the transfer gates 51-11, 51-12 through 51-1k of the two-way gate circuit 11-1 can be controlled individually by the transfer control means 52-1. For example, some bit lines of the two-way data bus 13 are used for the data transfer between the blocks 10-1 and 10-2. At the same time, the remaining bit lines of the data bus 13 are used for the data transfer between the blocks 10-1 and 10-n. In this case, the direction of the data transfer can also be specified, bit by bit, for the respective bit line. The direction may be from the bus 13 to the bus 14 or from the bus 14 to the bus 13. Accordingly, the data bus 13 can be utilized with high efficiency.

Figure 6:
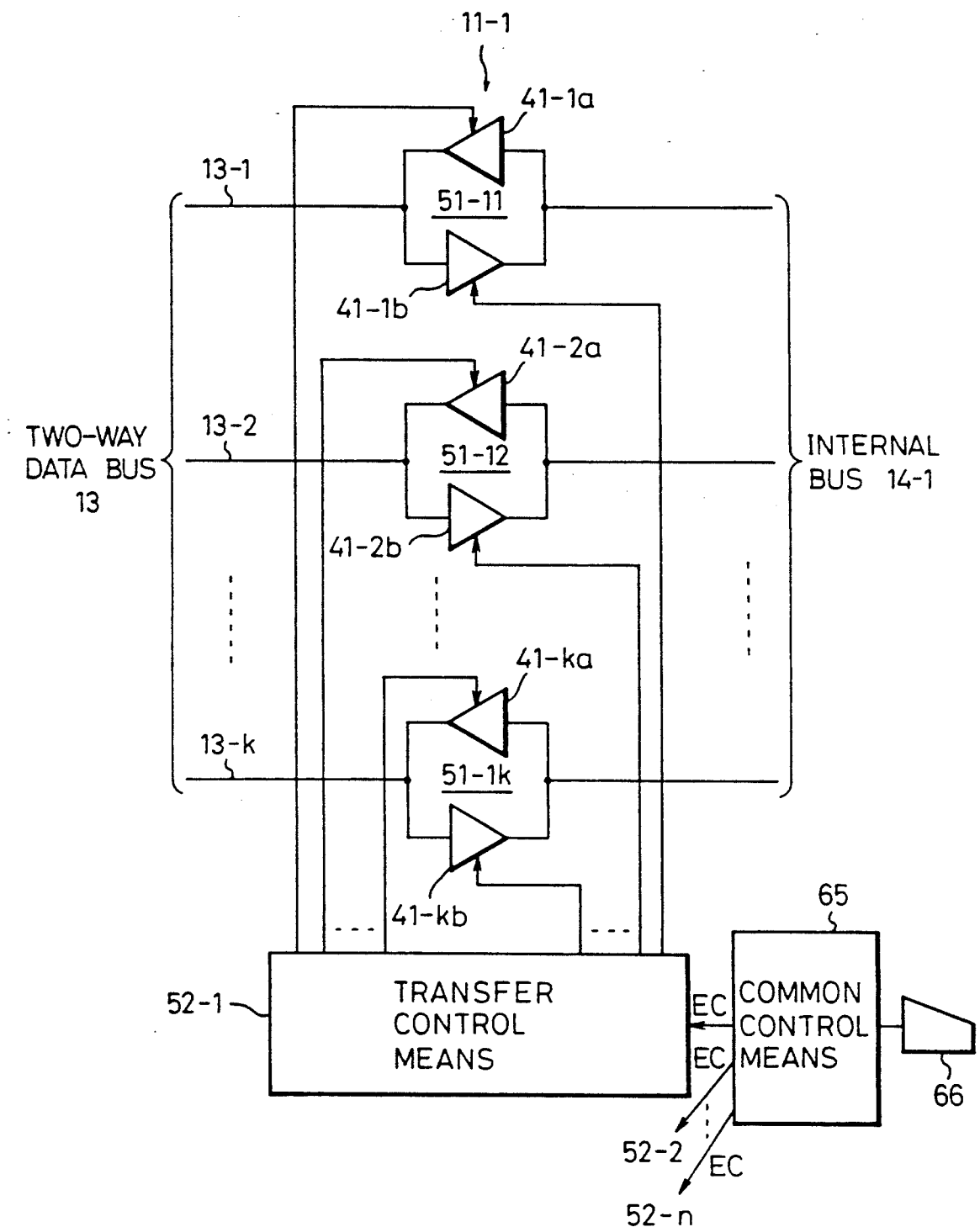
FIG. 6 shows a wiring diagram between the transfer gates and the transfer control means.

FIG. 6 shows a wiring diagram between the transfer gates and the transfer control means. The wiring diagram is illustrated with respect to the two-way gate circuit 11-1 and the corresponding transfer control means 52-1 both in the block 10-1, and as representative of the blocks 10-1 through 10-n.

The common control means 65 is commonly connected to the transfer control means 52-1, 52-2 through 52-n and supplies the external commands EC thereto, respectively.

The transfer gates 51-11 through 51-1k are comprised of the bus drivers and bus receivers, 41-1a, 41-1b, 41-2a, 41-2b . . . 41-ka, 41-kb, respectively. The bus drivers 41-1a to 41-kb and the bus receivers 41-1b to 41-kb are connected in parallel between the two-way data bus 13 comprised of k data bit lines 13-1 through 13-k and the internal bus 14-1, of a corresponding number of data bit lines, and which is distributed in the block 10-1 and connected to the internal circuit cards CC, as explained in FIG. 2. Incidentally, reference numeral 66 represents a console.

FIG. 7 is a block diagram of an example of the transfer control means. In FIG. 7, the transfer control means 52-1 is illustrated, as representative of the identical means 52-1 through 52-n. The transfer control means 52-1 is comprised of both a memory 72 and an interface unit 71. The interface unit 71 is connected to the common control means 65 to receive the external command EC and stores the same in the memory 72, which has output ports 73-1 through 73-n for producing control signals to be given to the bus drivers and bus receivers 41-1a, 1b, 41-2a, 2b, . . . 41-ka, kb individually. The memory 72 is implemented, in the example, by a random access memory (RAM). The common control means 65 manages the work of the blocks 10-1 through 10-n and, sometimes, receives a time schedule for using a particular communication apparatus, such as a TV camera, from the console 66 given by a system manager. Thus, an overall time schedule for operating the blocks is transformed into control signals in the common control means 65 and the control signals are stored in time series in the memory (RAM) 72. The control signals specify three gate modes which will be explained below.

Each of the transfer gates (51) is operated such that three gate modes are selectively performed, i.e., in a first gate mode, the bus driver is activated but the bus receiver is not activated, in a second gate mode, the bus receiver is activated but the bus driver is not activated, and in a third gate mode, the bus driver and bus receiver are both not activated.

(I) In one block (10), some transfer gates (51) are operated in the first gate mode by using some bits of the two-way data bus 13, while in another block some corresponding transfer gates are operated in the second gate mode by using the same bits of the two-way data bus 13.

(II) In paragraph (I), the remaining transfer gates (51) are operated in one of the first, second and third gate modes.

(III) In one block (10), some transfer gates (51) are operated in the second gate mode in association with some bit lines of the two-way data bus 13, while in another block, some transfer gates (51) are operated in the first gate mode, which latter gates are associated with the same bit lines of the two-way data bus 13.

(IV) In one block (10), some transfer gates (51) are operated in the third gate mode, and the remaining transfer gates (51) are operated in one of the first, second and third gate modes, and in this first or second gate mode, the remaining transfer gates (51) are connected with corresponding transfer gates in another block (10) operating in the second or first gate mode, respectively, and associated with the same, respective bit lines of the two-way data bus 13.

(V) In paragraph (IV), when all the transfer gates (51) in one block (10) are operated in the third gate mode, this block handles data to be transferred, solely, via the internal bus (14) between the circuit cards CC.

Details of the above modes will be explained below.

FIG. 8 depicts timing charts for explaining the individual control of the transfer gates. Note here that, in FIG. 8, only the bus drivers 41-1a through 41-8a (FIG. 6), assuming that 8-bit data buses 13-1 through 13-8 (k=8) comprise the two-way data bus 13, are referred to for brevity. In FIG. 8, rows (1a) through (8a), which correspond to the bus drivers 41-1a through 41-8a, respectively, exhibit control signals from the transfer control means, for example, 52-1 (FIG. 7). In FIG. 8, during time t1, only the bus drivers 41-1a through 41-4a are activated (ON), and therefore, 4-bit parallel data can be output to the data bit lines 13-1 through 13-4.

During a time t2, only the bus drivers 41-5a through 41-8a are activated, and therefore, 4-bit parallel data can be output to the data bit lines 13-5 through 13-8.

During a time t3, the bus drivers 41-1a through 41-8a are all activated, and therefore, 8-bit parallel data can be output to the data bus 13.

During a time t4, the bus drivers 41-1a through 41-8a are not activated (OFF), and therefore the data bit lines 13-1 through 13-8 are not occupied by the related block 10-1, but can be requested by another one (or more) of the blocks 10-2 through 10-n.

During a time t5, only the bus driver 41-1a is activated, and therefore, 1-bit data is output to the data bit line 13-1.

As understood from the above explanation, each transfer gate 51 assumes three ON-OFF combination states C1, C2 and C3 shown in the following table.

| transfer gate (51) | C1 | C2 | C3 |
| --- | --- | --- | --- |
| bus driver (41-1a, . . . -ka) | ON | OFF | OFF |
| bus receiver (41-1b, . . . -kb) | OFF | ON | OFF |

The present invention is featured by the state of column C3, i e., OFF-OFF (aforesaid third mode). Incidently, ON-ON state cannot exist because of the possibility of collision of input (receiving) data and output (sending) data on the same 1-bit data bit line.

Figure 9A:
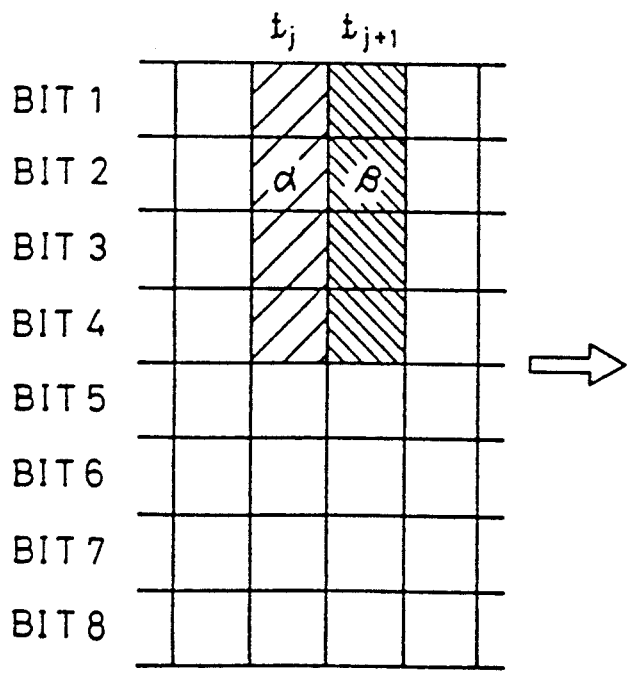
FIG. 9(a)–9(b) are a view of a bit allocation on the 8-bit data buses for schematically explaining an advantage of the present invention.
Figure 9B:
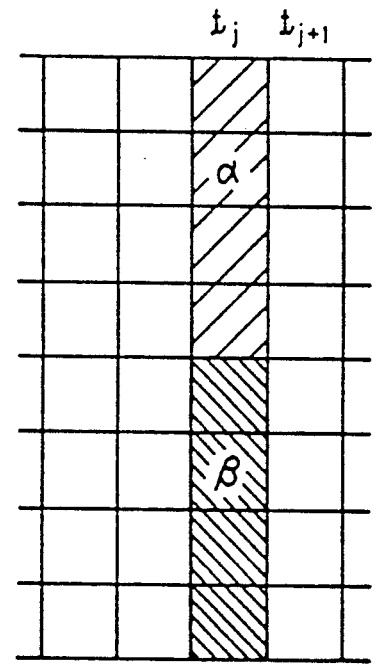

FIGS. 9A and 9B are diagrams of bit allocation on the 8-bit data buses for schematically explaining an advantage of the present invention. The bit allocation on the left side is based on the prior art technique, while the bit allocation on the right side is based on the present invention. Provided that two different 4-bit parallel data $\alpha$ and $\beta$ are to be transferred on the data bus, according to the prior art (left side and FIG. 9A), the 4-bit parallel data $\alpha$ is transferred at a time $t_j$ by using the 8-bit data buses (BIT 1 through BIT 8), and then the other 4-bit parallel data $\beta$ is transferred during a time $t_{j+1}$ by using the same bit lines, but in successive time slots. On the other hand, according to the present invention (right side and FIG. 9B), the data $\alpha$ and data $\beta$ can be transferred during the same time $t_j$ by using the upper 4-bit data bit lines (BIT 1 through BIT 4) and the lower 4-bit data bit lines (BIT 5 through BIT 8), respectively. This means that, during the time $t_{j+1}$, two (4-bit), or one (8-bit) parallel data other than the data $\alpha$ and $\beta$, can be transferred. Thus, the data bus 13 can be utilized with high efficiency. The data $\alpha$ and $\beta$ are, for example, speech signal elements, each composed of a 4-bit PCM code. Speech data has previously been composed of 8-bit PCM code. However, due to developments in this field, the number of bits comprising the PCM coded speech signal is halved to 4-bits. Thus, the present invention is advantageous in dealing with such compressed digital data. Alternately, the data $\alpha$ and/or $\beta$ may be low transmission speed digital data, each of which can be composed of a small number of bits less than 8.

Figure 10:
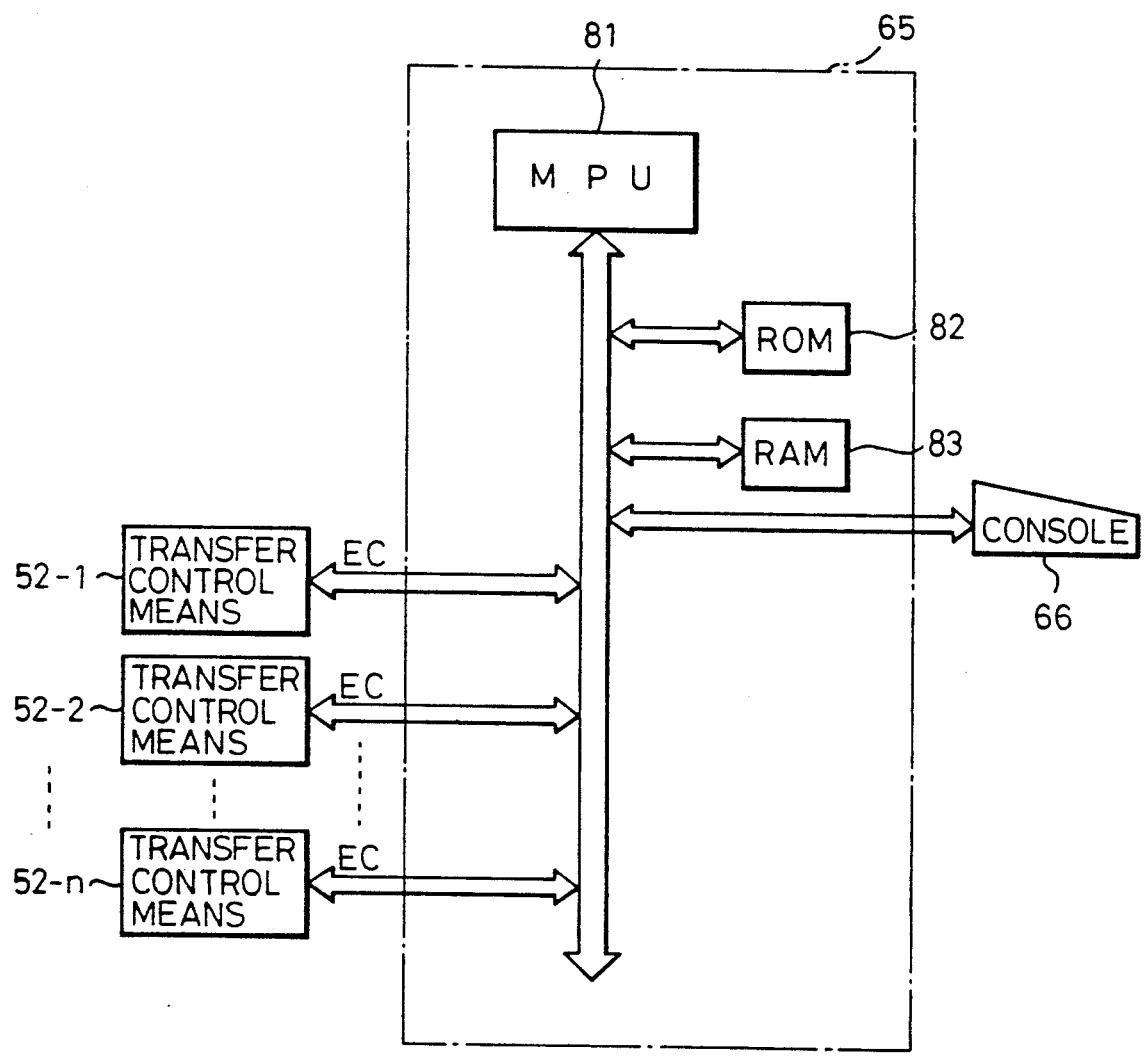
FIG. 10 is a block diagram showing an example of the common control means.

FIG. 10 is a block diagram showing an example of the common control means. In FIG. 10, the common control means 65 (FIG. 6) is constructed in the form of a usual microprocessor system. That is, the common control unit 65 is primarily composed of a microprocessor unit (MPU) 81, a read-only memory (ROM) 82 and RAM 83.

Figure 11:
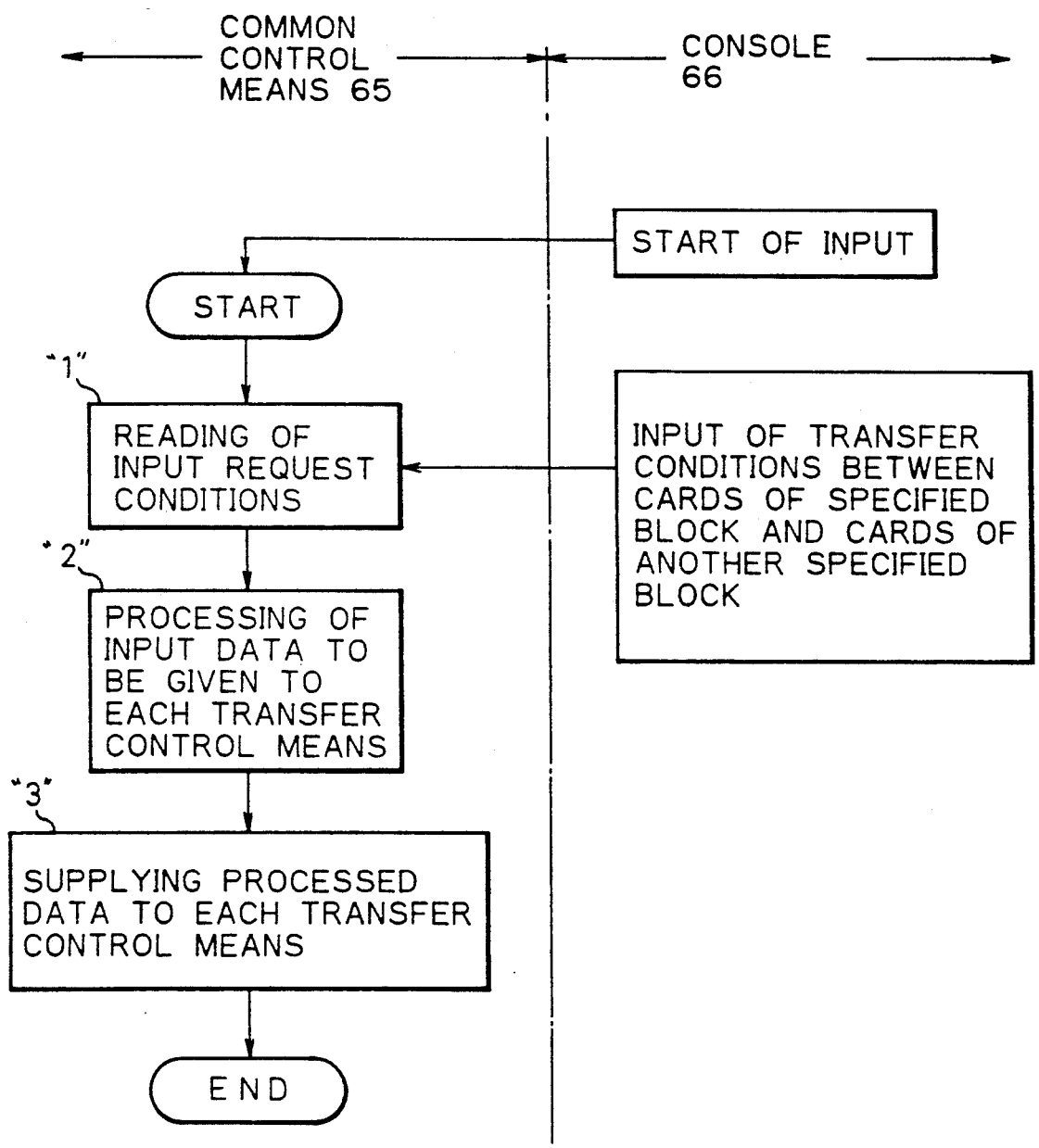
FIG. 11 is a general flow chart of a process handled by the common control means.

FIG. 11 is a general flow chart of a process handled by the common control means. In FIG. 11, first, an input is started by the console 66. Also, input of transfer conditions between the cards (CC) of one block (10) and the cards (CC) of another block (10), is effected from the console 66 to the common control means 65. The cards (CC) are the aforesaid circuit cards, such as a card for a multiplexing process, a card for a code conversion process, and the like. The term "transfer conditions" means the aforesaid number of bits of data and a direction of transfer thereof.

At step "1", the common control means 65 reads the input of the related request conditions.

At step "2", the common control means 65 processes the related input data to be given to each of the transfer control means 52-1, 52-2 through 52-n. To be specific, the common control means 65 determines the aforesaid first through third gate modes in terms of time slots for each transfer gate (51), in such a manner as to avoid any occurrence of a collision between data on each of data bit lines 13-1 through 13-k.

At step "3", the thus determined data are supplied to each transfer control means (52) and stored in respective memories 72 (FIG. 7). Thus, each transfer control means (52) controls the ON-OFF state of the bus driver and the bus receiver in each transfer gate (51).

It should be understood here that, in actuality, the aforesaid input request conditions are not specified call-by-call, but periodically, for example, day-by-day or hour-by-hour.

Figure 12B:
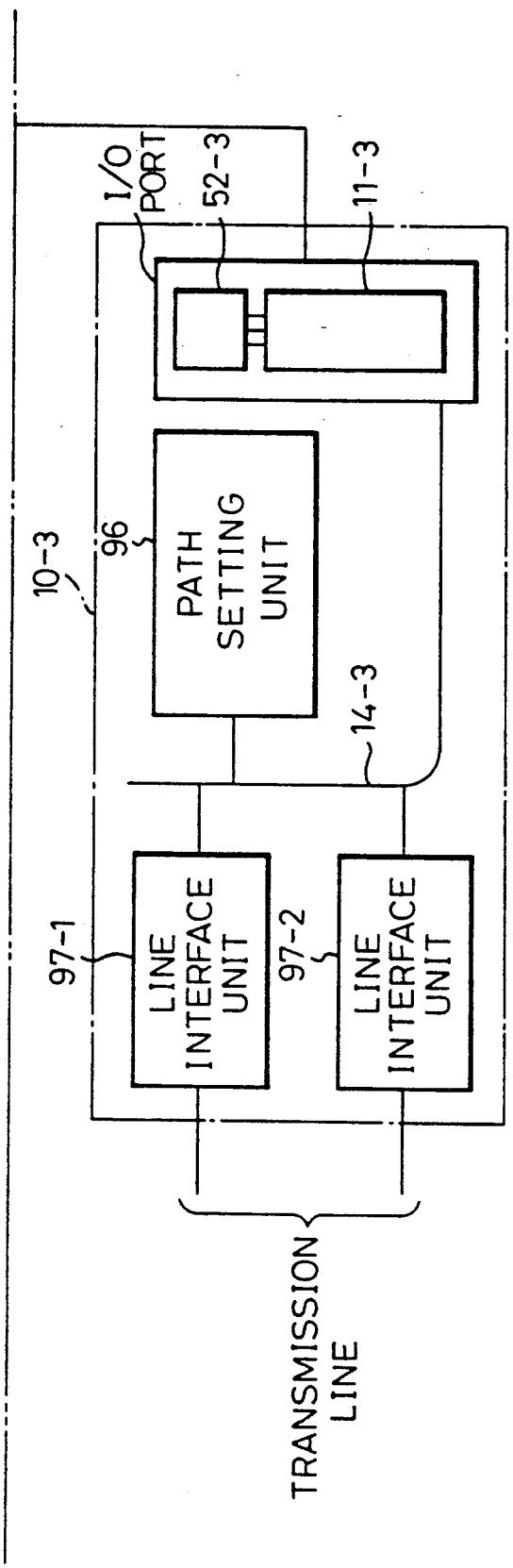

FIGS. 12A and 12B together comprise a detailed block diagram of an example of a multiplexer to which the present invention can be adapted. In FIG. 12, the following members have already been explained, i.e., the blocks 10-1, 10-2, 10-3, the two-way gate circuits 11-1, 11-2, 11-3 (including the transfer gates (51)), the two-way data bus 13, the internal buses 14-1, 14-2, 14-3, the time division multiplexer 31, and the transfer control means 52-1, 52-2 and 52-3. Newly disclosed members are expansion.compression processing units 93-1, 93-2, 93-3, interface units 94-11 . . . 94-1m, 94-21 . . . 94-2m, and line interface units 97-1 and 97-2. All the members, except for the internal buses (14), are constructed in the form of circuit cards CC as shown in FIG. 2. The common control means (see 65 in FIG. 6) is omitted in FIG. 12.

The interface units (94) are connected to the various communication apparatuses (refer to TE, PBX, FAX, TV shown in FIG. 1), by way of an exchange (not shown).

The expansion/compression processing unit (93) compresses speech data of 64 kbps PCM codes into 32 kbps PCM-code speech data and alternatively expands the speech data of 32 kbps PCM codes into 64 kbps PCM-code speech data. These speech data are transferred between the corresponding interface unit (94) and the I/O port via the internal bus (14) and sent to or received from the data bus 13.

In the block 10-3, the data, to be transmitted to the remote office, is transferred, under control of the path setting unit 96 according to call control information, from the I/O port to the corresponding line interface unit (97) via the internal bus 14-3, and then output to the transmission line.

Contrary to this, the data transmitted from the remote office, is received at the corresponding line interface unit (97) and applied, via the internal bus 14-3, to the path setting unit 96 in which the received data is processed according to call control information. The thus processed data is output, via the I/O port, to the two-way data bus 13 and distributed to a related block (10).

In the blocks 10-1 and 10-2, the compressed data of 32 kbps are applied to the expansion/compression processing units 93-1, 93-2 via the internal buses 14-1, 14-2, respectively. At the units 93-1, 93-2, the received data are expanded into 64 kbps PCM-code data and then applied, via the internal buses 14-1, 14-2, to the interface units (94).

The path setting unit 96 supervises the series of time slots which are cyclicly allotted to the data channels. The signals of respective data channels are inserted or taken out at every specified time slot. This is referred to as a path setting which is not new but common in this field.

Figure 13:
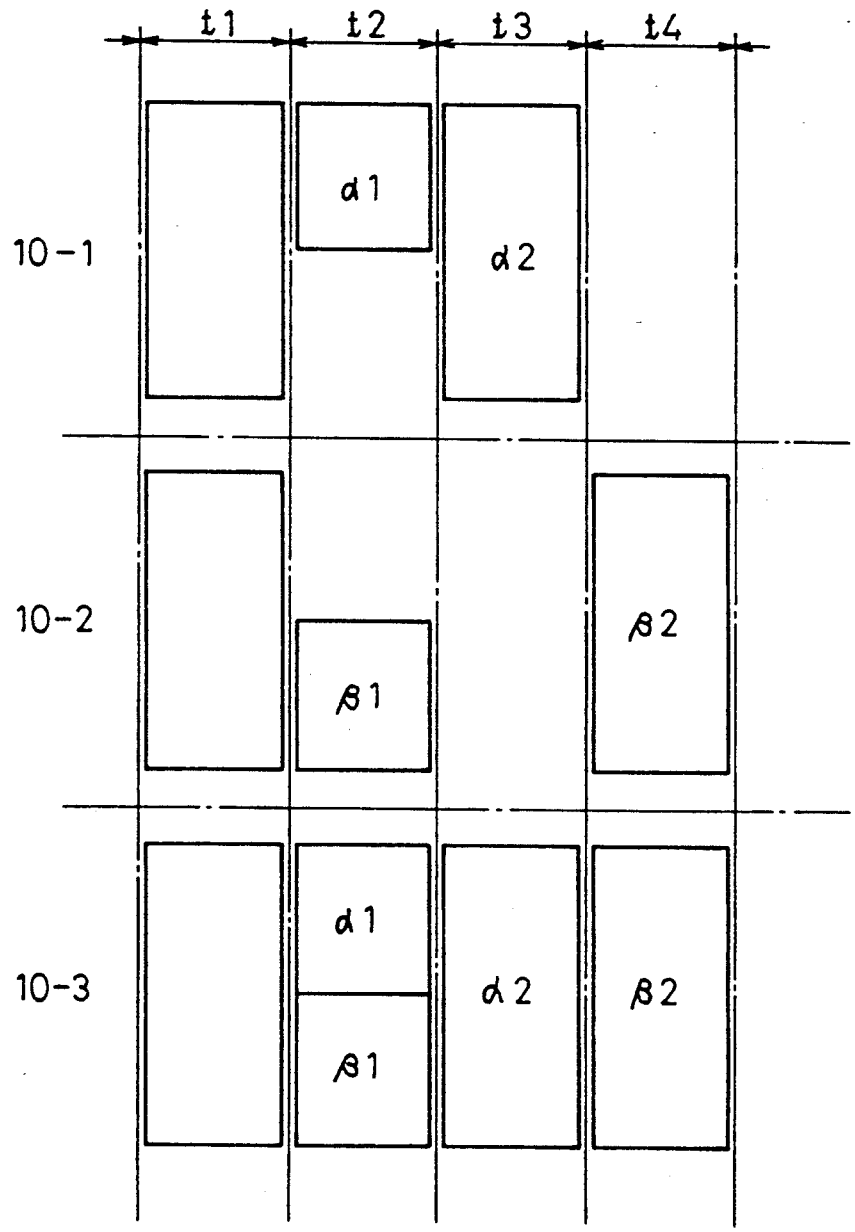
FIG. 13 depicts an example of a data transfer achieved in FIG. 12.

FIG. 13 depicts an example of a data transfer achieved in FIG. 12. In FIG. 13, during a time t2 (this t2 has nothing to do with t2 in FIG. 8), half data lines of the two-way data bus 13 are used for transferring data $\alpha 1$ from the block 10-1. During the same time t2, the remaining half of the data lines of the bus 13 are used for transferring data $\beta 1$ from the block 10-2. Also during the same time t2, the block 10-3 receives both the data $\alpha 1$ and $\beta 1$ simultaneously sent from the blocks 10-1 and 10-2, respectively. It should be noted here that the directions of the data transfers may be reversed. That is, the block 10-3 may transmit the data $\alpha 1$ and $\beta 1$, and the blocks 10-1 and 10-2 may receive the data $\alpha 1$ and $\beta 1$, respectively.

During a time t3, all the bits of the data bus 13 are used for transferring data $\alpha 2$ between the blocks 10-1 and 10-3.

During a time t4, all the bits of the data bus 13 are used for transferring data $\beta 2$ between the blocks 10-2 and 10-3.

As mentioned above, during the time t2, the transfer gates (51) in each of the blocks 10-1 through 10-3 can be individually controlled so that different data can be handled at the same time as depicted in FIG. 9B.

Accordingly, it is also possible to insulate the internal bit lines of the respective buses 14-1 through 14-3 of the blocks 10-1 through 10-3 from the data bus 13 and thereby to operate these blocks independently of each other (i.e., third gate mode). This produces an advantage in that the throughput of each block is prevented from being reduced even if an internal operation in each block increases due to, for example, frequent data transfer between the circuit cards CC in the same block, via the expansion/compression processing unit (93).

A further advantage is that a high speed data transfer can be achieved by the use of all bits of the data bus 13, and on the other hand, a low speed data transfer of a plurality kinds of information can be achieved simultaneously by dividing the bits of the data bus 13. Thus, the data bus 13 can be utilized with high efficiency by the blocks 10-1, 10-2 and 10-3.

As explained above in detail, the present invention makes it possible to control the transfer gates (51) individually under control of the transfer control means (52). This enables a variety of data transfer modes with respect to the number of bits of data and the direction of transfer of each data bit to be transferred, and accordingly, highly efficient data transfers between the blocks (10) can be attained. This means that the present invention is suitable for multiplexers in a multi-media data communication system which deals with high speed and low speed data, for increasing the number of channels to be accommodated therein, as much as possible.

I claim:

1. A data transfer system for performing parallel data transfers of a number of bits of data selectively in respective, first and second directions of transfer, comprising:

a two-way data bus of plural data bit lines;
   plural blocks, each block comprising:
      an internal bus of plural data bit lines respectively corresponding to said plural data bit lines of said two-way data bus,
      a two-way gate circuit interconnecting said two-way data bus and said internal bus and comprising plural two way transfer gates respectively associated with and interconnecting said respectively corresponding data bit lines of said two-way data bus and said internal bus, each two-way transfer gate selectively and individually enabling transfer of a data bit therethrough in a specified direction from one to the other of the respective and corresponding internal and two-way data bus bit lines interconnected thereby, in a first direction, from the respective internal bus bit line to the corresponding two-way data bus bit line, and in a second direction, from the corresponding two-way data bus bit line to the respective internal bus bit line,
      plural internal circuit cards commonly connected to the internal bus and selectively performing parallel data bit transfers therebetween, and
      transfer control means, responsive to external command signals supplied thereto and designating the number of bits and specifying the direction of transfer of each such bit of a respective parallel data bit transfer between the internal bus of the block and the two-way data bus, for selectively and individually operating the two-way transfer gates which respectively correspond to the thus designated and specified bits of the respective parallel data bit transfer so as to enable the transfer therethrough of the thus designated and respectively corresponding data bits in the respective, specified directions;
   said two-way data bus providing for parallel and simultaneous transfer of plural data bits, respectively in individually selected first and second opposite directions over the corresponding data bit lines thereof, in accordance with the selective and individual operation of the plural two-way transfer gates of the respective two-way gate circuits of the plural blocks as controlled by the respective transfer control means thereof; and
   common control means connected to the plural transfer control means of the respective, plural blocks, for selectively supplying said external command signals thereto in successive time intervals for commanding respective, successive parallel data bit transfers.

2. A system as recited in claim 1, wherein:
   each of said two-way transfer gates comprises a bit line driver and a bit line receiver, connected in parallel between the respectively corresponding bit lines of the two-way data bus and of the internal bus of the corresponding block.

3. A system as recited in claim 2, wherein:
   each said transfer control means comprises a memory having plural storage locations and an interface unit, the interface unit being connected to the common control means for receiving the command signals supplied thereto by the common control means and for storing same as control signals in corresponding storage locations of the memory; and
   the memory further comprises output ports, respectively associated with the storage locations of the memory and with the bit line drivers and bit line receivers, for supplying the control signals, as stored in the respectively associated storage locations, to the respectively associated bit line drivers and bit line receivers.

4. A system as recited in claim 3, wherein:
   said common control means produces external command signals defining control signals specifying the selective performance, by each of the two-way gate circuits of the respective blocks, of one of three different modes of operation; and
   the interface unit of the transfer control means of each respective block receives the external command signals selectively supplied thereto and stores the corresponding control signals defined thereby in the predetermined memory locations for supply through the output ports of the memory to the respectively corresponding two-way transfer gates of the two-way gate circuit of the corresponding block, the control signals defining, selectively and as to each of the two-way gate circuits, a first gate mode corresponding to the first direction of transfer and in response to which the bit line driver of the respectively associated two-way transfer gate is activated but the bit line receiver thereof is not activated, a second gate mode corresponding to the second direction of transfer and in response to which said bit line receiver is activated but said bit line driver is not activated, and a third gate mode in which neither of said bit line driver and said bit line receiver is activated.

5. A system as recited in claim 4, wherein:
   the common control means supplies external command signals, selectively and substantially simultaneously, to the respective transfer control means of selected first and second blocks, the external command signals defining control signals for operating a selected, first set of less than all of the plural two-way transfer gates of the first block in the first gate mode and for operating a correspondingly selected, second set of less than all of the plural two-way transfer gates of the second block in the second gate mode thereby to transfer, in parallel, the corresponding data bits from the first block to the second block over a corresponding, first set of less than all of the plural bit lines of the two-way data bus commonly associated with the first and second sets of the two-way transfer gates of the respective, first and second blocks.

6. A system as recited in claim 5, wherein the common control means, selectively and substantially simultaneously with the supply to the first and second sets of transfer control means, supplies further external command signals to the remaining transfer control means, the further external command signals thereof defining corresponding, further control signals for selectively operating the respective, remaining two-way transfer gates in the first, second, or third gate modes.

7. A system as recited in claim 3, wherein:
the common control means supplies external command signals, selectively and substantially simultaneously, to the respective transfer control means of selected, first and second blocks, the external command signals defining control signals for operating a selected, first set of less than all of the plural two-way transfer gates of the first block in the second gate mode and for operating a correspondingly selected, second set of less than all of the plural two-way transfer gates of the second block in the first gate mode thereby to transfer, in parallel, the corresponding data bits from the second block to the first block over the corresponding set of less than all of the plural bit lines of the two-way data bus commonly associated with the first and second sets of the two-way transfer gates of the respective, first and second blocks.

8. A system as recited in claim 3, wherein:
the common control means supplies external command signals, selectively and substantially simultaneously, to all of the transfer control means of all of said plurality of blocks, the external command signals defining control signals for selectively operating a set of less than all of the two-way transfer gates of a specified block in the third gate mode and for operating the remaining two-way transfer gates of both the specified block and the remaining blocks selectively in the first gate mode, the second gate mode, or the third gate mode, each such remaining two-way transfer gate, of a given block and which is thereby selectively operated in the first gate mode, being connected to a remaining two-way transfer gate of another block and which is thereby selectively operated in the second gate mode, and each such remaining two-way transfer gate, of the same given block or any other block and which is thereby selectively operated in the second gate mode, being connected to a corresponding, remaining two-way gate of another, different block and which is thereby selectively operated in the first gate mode, over respectively corresponding bit lines of the two-way data bus.

9. A system as recited in claim 3, wherein:
the common control means supplies external command signals, selectively and substantially simultaneously, to all of the plural transfer control means of a given block, defining corresponding control signals for operating all of the plural two-way transfer gates of the given block in the third gate mode and thereby for exclusively transferring data between said circuit cards of said given block over the corresponding plural bit lines of the internal bus of said given block.

10. A system as recited in claim 1, wherein:
said common control means produces external command signals defining control signals specifying the selective performance, by each of the two-way gate circuits of the respective plural blocks, of a first mode of operation corresponding to the first direction of transfer, a second mode of operation corresponding to the second direction of transfer and of a third mode of operation in which none of the two-way transfer gates of a given block is enabled and said external command signals produced by said common control means specify the performance of a data transfer between specified circuit cards and over the internal bus of the respective block.

* * * * *

UNITED STATES PATENT AND TRADEMARK OFFICE
CERTIFICATE OF CORRECTION

PATENT NO.   :   5,274,769
DATED        :   December 28, 1993
INVENTOR(S)  :   ISHIDA It is certified that error appears in the above-indentified patent and that said Letters Patent is hereby corrected as shown below:

Col. 3,   line 11, after "TRANSMISSION" insert --LINE")--.

Col. 4,   line 57, after "(11)" insert --by the respective--, after "(51)" insert --thereof-- and delete "by the re-";
line 58, delete "spective";
line 59, delete "thereof,".

Signed and Sealed this

Eleventh Day of October, 1994

Attest:

BRUCE LEHMAN

*Attesting Officer*            *Commissioner of Patents and Trademarks*